May 9, 1961  B. F. MEYER  2,983,307
SEAT ADJUSTING MECHANISM
Filed Dec. 19, 1956  3 Sheets-Sheet 1
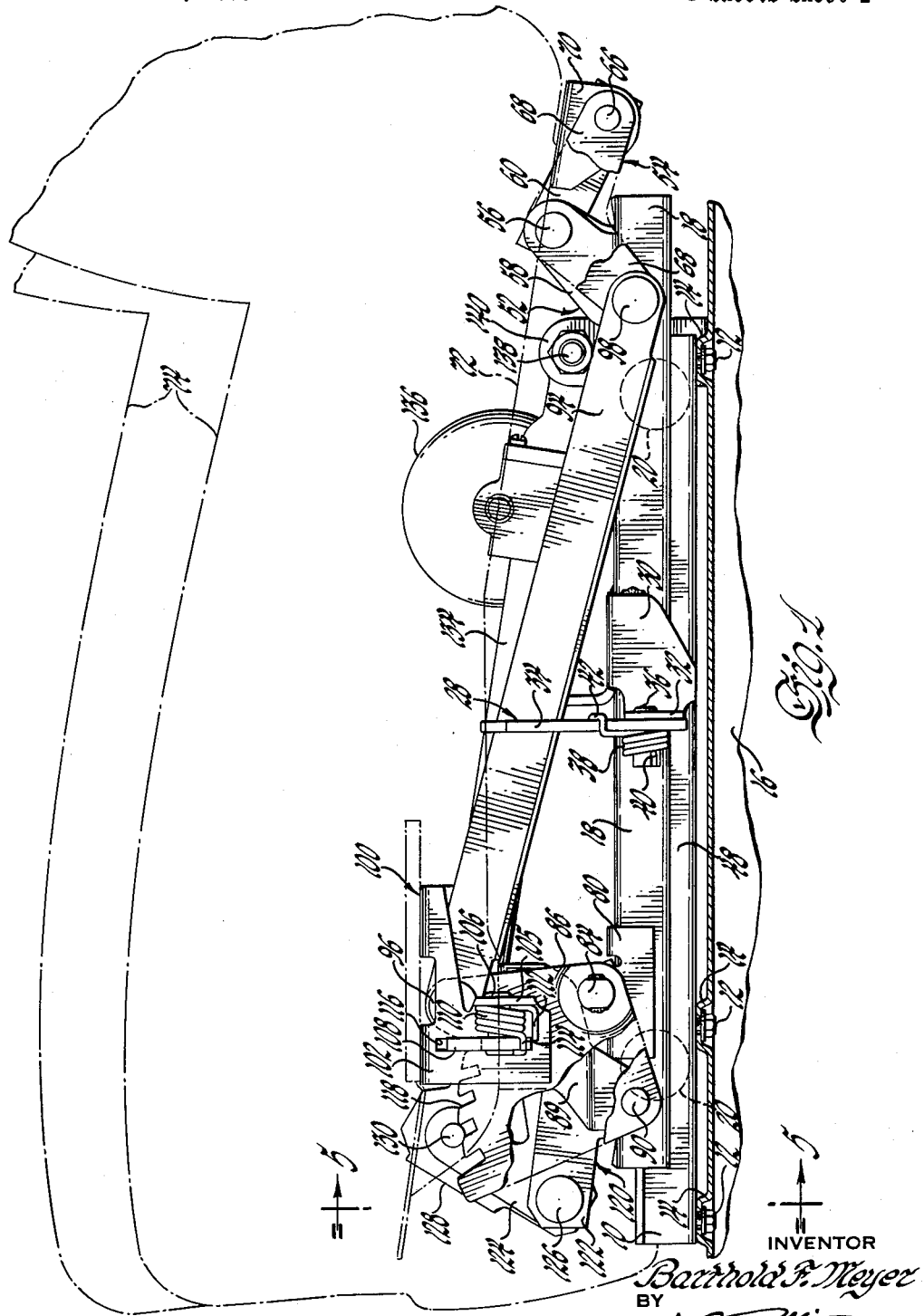
INVENTOR
Barthold F. Meyer
BY
W. S. Pettigrew
ATTORNEY May 9, 1961  B. F. MEYER  2,983,307
SEAT ADJUSTING MECHANISM
Filed Dec. 19, 1956  3 Sheets-Sheet 2
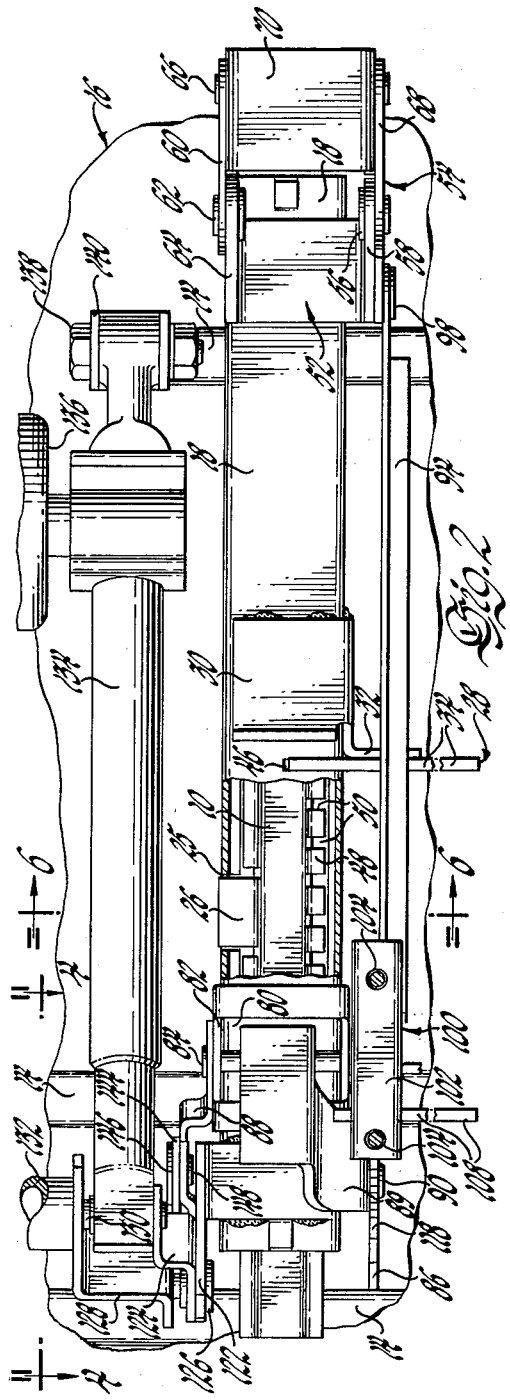
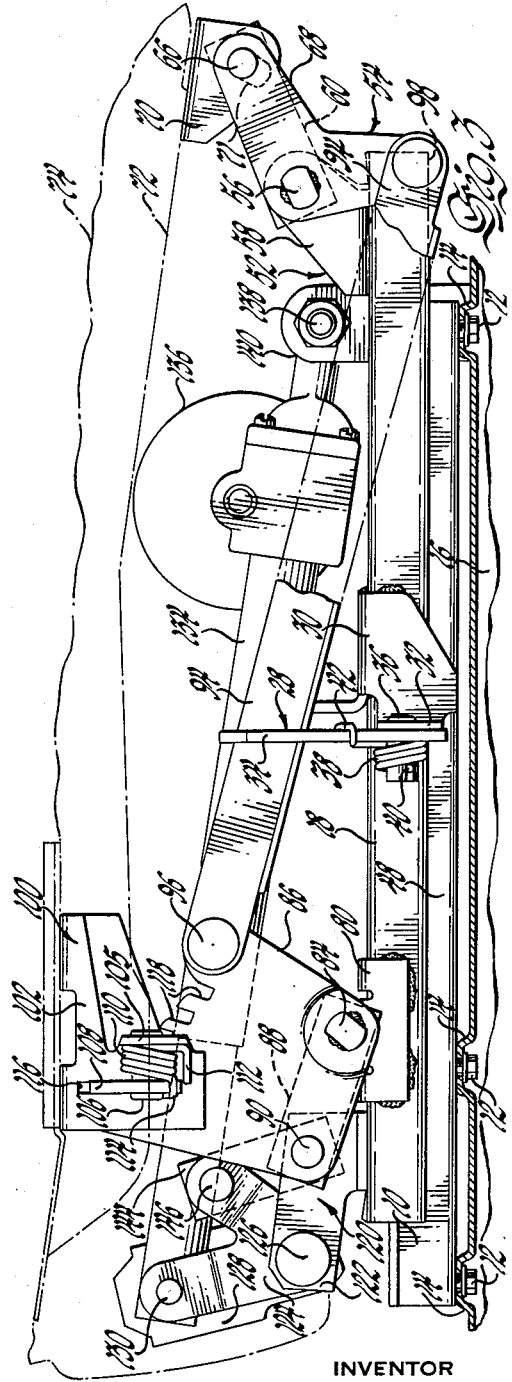
INVENTOR
Barthold F. Meyer
BY
W. S. Pettigrew
ATTORNEY

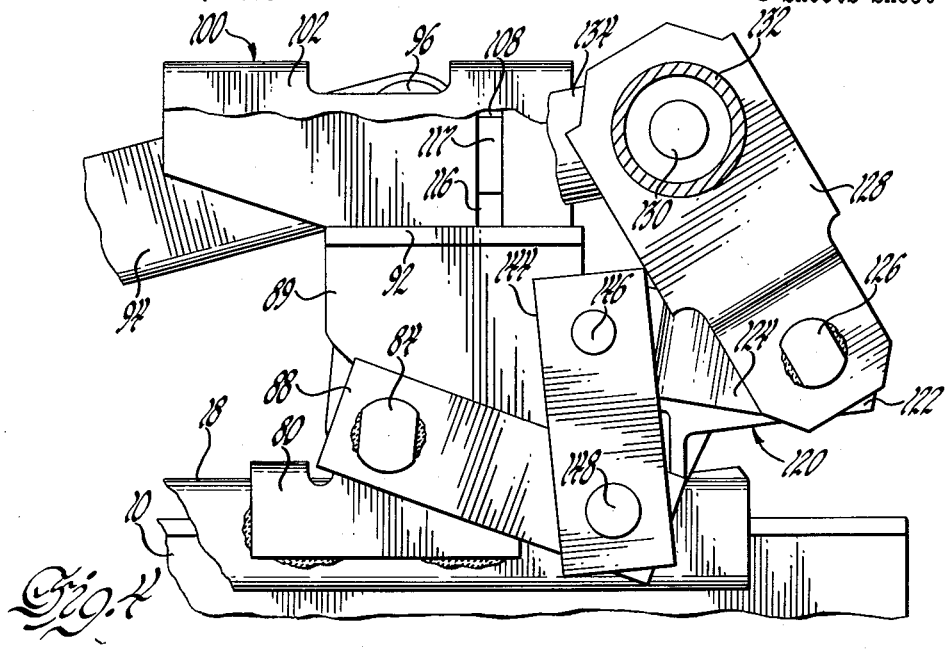

United States Patent Office 2,983,307
Patented May 9, 1961

2,983,307

SEAT ADJUSTING MECHANISM

Barthold F. Meyer, St. Clair Beach, Ontario, Canada, assignor to General Motors Corporation, Detroit, Mich., a corporation of Delaware Filed Dec. 19, 1956, Ser. No. 629,261

7 Claims. (Cl. 155—14)

This invention relates to seat adjusting mechanisms and more particularly to power operated seat adjusting mechanisms. The power operated seat adjusting mechanism of this invention includes both horizontal and vertical adjusting means which are selectively and independently operable to adjust the seat either horizontally or vertically. In the past, such mechanisms have usually included a separate power actuator for each adjusting means. This is a disadvantage since it necessarily increases the cost of such mechanisms.

Although the seat adjusting mechanism of this invention is power operated, only a single power actuator is employed to selectively actuate either the horizontal or vertical adjusting means. By providing only a single power actuator for both horizontal and vertical adjusting means, the cost of the adjusting mechanism is reduced and a more compact mechanism is provided to thereby reduce the time and cost of assembly and to provide for ease of installation.

The primary object of this invention is to provide a new and improved power operated vehicle seat adjusting mechanism. Another object of this invention is to provide a new and improved power operated vehicle seat adjusting mechanism which is selectively adjustable in either horizontal or vertical directions. A further object of this invention is to provide a new and improved vehicle seat adjusting mechanism which is selectively adjustable in either horizontal or vertical directions and which employs only a single power actuator for selective adjustment in either direction.

These and other objects of this invention will be readily apparent from the following specifications and drawings, in which:

Figure 1 is a side elevational view of a vehicle seat adjusting mechanism according to this invention in its lower vertical limit position, with parts thereof broken away for clarity of illustration;

Figure 2 is a plan view of the mechanism of Figure 1, with parts thereof broken away for clarity of illustration;

Figure 3 is a view similar to Figure 1 and showing the mechanism in its upper vertical limit position;

Figure 4 is an enlarged side elevational view of the front portion of the mechanism taken on the plane indicated by line 4—4 of Figure 2, with parts thereof broken away for clarity of illustration;

Figure 5 is a front elevational view of the mechanism taken on the plane indicated by line 5—5 of Figure 1; and Figure 6 is a partial sectional view taken on the plane indicated by line 6—6 of Figure 2.

Before proceeding with a description of the seat adjusting mechanism of this invention, it will be understood that one of the adjusting mechanisms is provided for each side of the seat, with each of the mechanisms being substantially the same except as hereinafter noted. Therefore, only one such seat adjusting mechanism will be described and it will be understood that the other is of the same construction, except as noted, although of different hand.

Referring now to the drawings, the lower channel 10 of a seat slide structure is bolted at 12 to a number of spaced upwardly extending embossed ribs 14 of the vehicle floor pan 16 in order to fixedly mount the lower channel on the body. The upper channel 18 of the slide structure receives the lower channel, with the channels being spaced by a number of rollers 20 engaging the respective bases of the channels, and a number of ball bearings 22 which are located between the complementary flanges 23 and 24 of the lower and upper channels, respectively, Figure 6. The upper channel is thus slidably supported for horizontal movement relative to the lower channel which is stationary. As may be seen particularly in Figures 2 and 6, the inboard side wall of the upper channel is slotted at 25 and receives a tab 26 lanced out of the inboard side wall of the lower channel to provide a limit stop for movement of the upper channel relative to the lower channel in either direction.

A latch mechanism 28 is provided in order to hold the upper channel 18 in any horizontally adjusted position thereof with respect to the lower channel 10. An angular bracket 30 is welded or otherwise secured to the upper channel 18 and includes a laterally outwardly extending flange 32 at the outboard wall thereof. A lever 34 is swingably mounted on a stud 36 which is fixed to flange 32, and a coil torsion spring 38 having one end 40 thereof fixed within the slotted end of stud 36 and the other end 42 thereof bearing against the outboard edge of lever 34 biases the lever inboard of the seat or counterclockwise, as viewed in Figure 6. The lever includes a latch dog 44 which is movable inwardly and outwardly of a slot 46 in the base wall of the upper channel. The outboard side wall 48 and flange 23 of the lower channel is provided with a number of spaced slots 50, and the latch dog 44 of lever 34 is adapted to fit within any one of these slots in order to hold the upper channel in a horizontally adjusted position with respect to the lower channel. Since a latch mechanism 28 will be provided for each of the spaced seat adjusting mechanisms, it is intended that the latch levers 34 be interconnected in a suitable manner, such as by shiftable links or wires, so that operation of one of the levers results in simultaneous operation of the other lever.

Referring now particularly to Figures 1, 2, and 3 of the drawings, a U-shaped bracket 52 has its base welded or otherwise fixedly secured to the upper channel 18 adjacent the rear end thereof. A bell crank 54 is pivotally secured at 56 to the outboard leg 58 of bracket 52 and a link 60 is pivoted at 62 at one end thereof to the inboard leg 64 of the bracket, with pivots 56 and 62 being aligned with respect to each other. A stud 66 fixedly secured to the other end of link 60 and to the upper leg 68 of the bell crank 54 slidably and rotatably receives a U-shaped bracket 70 which fits between the link and bell crank. The bracket 70 is provided with slotted openings 71, Figure 3, in each of the legs thereof which receive the stud 66 and provide a lost motion connection between the bracket and the link and bell crank lever for a purpose to be described. The base of bracket 70 is welded or otherwise secured to the seat frame, indicated schematically at 72, which supports a seat 74, Figure 1.

Referring now particularly to Figures 3 through 5 of the drawings, a generally U-shaped bracket 80 is welded or otherwise secured to the upper channel 18 adjacent the forward end thereof and includes a pair of upwardly extending tabs 82 which are lanced out of the base of the bracket. A shaft 84 extends between the tabs 82 and is rotatably mounted therein. A sector 86 is fixedly secured to the outboard end of shaft 84 and an offset link 88 is fixedly secured to the inboard end of the shaft so that the sector and link will rotate simultaneously with respect to each other. An offset bracket 89, Figures 2 and 5, is pivotally secured at 90 to the sector 86 and includes a laterally extending flange 92 at the upper end thereof which is fixedly secured in a suitable manner to the seat frame 72. A flanged link 94 is pivotally secured at 96 to sector 86 and at 98 to the other leg of bell crank 54. Thus, if the sector 86 is rotated in a counterclockwise direction, as viewed in Figure 3, about the axis of shaft 84, the link 94 will cause the bell crank 54 and link 60 to rotate in a clockwise direction about an axis defined by the pivots 56 and 62. Similarly, if the sector 86 is rotated in a clockwise direction about the axis of shaft 84, the link 94 will cause the bell crank 54 and link 60 to rotate in a counterclockwise direction about an axis defined by the pivots 56 and 62. Since the sector is pivotally secured at 84 to the bracket 89 which is fixed to the seat frame, clockwise movement of the sector will result in bracket 89 being shifted upwardly to raise the front portion of the seat as the rear portion of the seat is simultaneously raised since counterclockwise movement of the bell crank 54 and link 60 shifts bracket 70 upwardly. Similarly, counterclockwise movement of the sector 86 about the axis of shaft 84 will result in bracket 89 being shifted downwardly to lower the front portion of the seat as the rear portion of the seat is lowered since clockwise movement of the bell crank 54 and link 60 will lower bracket 70. Thus, the sector 86 and the bell crank 54 and link 60 provide the vertical adjusting means for the seat. The slotted openings 71 in bracket 70 provide a lost motion connection between the seat and bell crank 54 and link 60, while bracket 89 provides a lost motion connection between sector 86 and the seat. The lost motion connections between the seat and the front and rear vertical adjusting means prevent binding at the pivots 66 and 90 and allow the front and rear vertical adjusting means to swing in opposite directions as the front and rear portions of the seat are simultaneously raised and lowered.

A latch mechanism 100, which is mounted on the seat, as will be described, is provided in order to hold the sector 86 in various rotative positions thereof with respect to the seat and upper channel 18 and thereby hold the heat in various vertically adjusted positions thereof. The latch mechanism generally includes a U-shaped mounting bracket 102 which receives sector 86 and is secured to the seat frame 72 at 104. The outboard leg of bracket 102 is provided with a laterally outwardly extending flange 105 which fixedly mounts a pin 106. A latch lever 108 is rotatably mounted on the pin 106 and is biased counterclockwise as viewed in Figure 5, by a coiled torsion spring 110 having one end 112 thereof bearing against the outboard leg of bracket 100 and the other end 114 thereof being hooked over the lever 108. A slot 116 is provided in the outboard leg of bracket 102 and a similar slot is provided in the inboard leg of the bracket in alignment with slot 116 in order to allow swinging movement of the lever relative to the bracket. The lever includes a latch dog 117 which is adapted to fit within any one of the notches 118 of sector 86 in order to hold the sector in various rotative positions with respect to its pivotal support on the upper channel 18.

Thus, if it is desired to vertically adjust the seat either upwardly or downwardly, as previously described, the latch lever 108 is moved out of engagement with the particular notch 118 of the sector and the seat is then vertically adjusted. After the seat has been moved to its vertically adjusted position, the latch lever is again moved into engagement with the desired notch 118 of the sector in order to hold the seat in its adjusted position.

An angular bracket 120 has one leg thereof fixedly secured to the upper channel 18 of the seat slide structure forwardly of the bracket 80. The forwardly extending leg 122 of the bracket 120 provides a pivotal support for an offset bell crank lever 124 which is pivoted to the leg at 126. Also pivotally secured to leg 122 at 126 is one end of a link 128 which is offset complementary to one of the legs of bell crank 124 as may be seen particularly in Figures 2 and 5. A pin 130 extends between free ends of link 128 and the complementary offset leg of the bell crank and is welded or otherwise secured to a torque rod 132 which spans the seat transversely thereof. A screw jack 134 driven by a motor 136 has its forward end received between the offset link and the complementary leg of the bell crank lever and rotatably mounted on the pin 130. The rear end of the screw jack is pivotally secured at 138 between the legs of a U-shaped bracket 140 which is fixed in a suitable manner to one of the offset ribs 14 of the vehicle floor pan 16. An offset link 144 has one end thereof pivotally secured at 146 to the other offset leg of bell crank lever 124 and the other end of the link is pivotally secured at 148 to the offset link 88, with pivot 148 being aligned with pivot 90 which secures the offset bracket 89 to sector 86, as previously described.

As previously mentioned, the seat adjusting mechanism of this invention includes only the single power actuator 134 for selective horizontal or vertical adjustment of the seat. Assuming now that it is desired to vertically raise the seat from its position of Figure 1 to its position of Figure 3, the latch lever 108 is manually operated to release the latch dog 117 from engagement with the rear terminal notch 118 of sector 86 and the motor 136 is then operated to extend the screw jack 134 and thereby swing link 128 and bell crank 124 counterclockwise about their pivotal support 126 on bracket 122. As the link and bell crank swing in this direction, the link 144 will be shifted forwardly and upwardly to in turn swing link 88 clockwise about the axis of shaft 84, as viewed in Figure 3. Since the link 88 and the sector 86 are fixedly interconnected by the shaft 84, the sector 86 will be moved in a clockwise direction with respect to the axis of shaft 84 to raise the front portion of the seat, with the rear portion of the seat being simultaneously raised by means of the bell crank 54 and link 60, as previously described. When the seat has been moved to its position of Figure 3, the latch lever 108 is released to allow the latch dog 117 thereof to fit within the forward terminal slot 118 of the sector and thereby hold the seat in this vertical position after the electric motor 136 is turned off.

If it is desired to return the seat from its position of Figure 3 to its position of Figure 1, or to any intermediate position therebetween, the electric motor 136 is operated in a reverse direction to retract the screw jack 134 after the latch lever 108 has been moved to release the latch dog 117 thereof from engagement with the forward termianl notch 118 of sector 86. As the screw jack is retracted, the offset link 128 and the bell crank lever 124 will be rotated clockwise about their pivot 126 on bracket 120 so that the link 144 will be shifted rearwardly and downwardly. As the link 144 is shifted in this direction, it will move link 88 counterclockwise about the axis of shaft 84 and in turn swing the sector 86 in a counterclockwise direction about the same axis. As the sector swings in this direction, the front end of the seat will be lowered as bracket 89 is lowered and the rear end of the seat will be simultaneously lowered as the bell crank 54 and link 60 swing in a clockwise direction about the axis defined by pivots 56 and 62, as previously described. After the seat has been moved to its position of Figure 1, the latch lever 108 is released to move the latch dog 117 into engagement with the rear terminal notch 118 of sector 86.

Assuming now that it is desired to adjust the seat horizontally forwardly, the latch lever 34 is grasped and moved downwardly or clockwise, as viewed in Figure 6, to move the latch dog 44 out of engagement with the slot 50 of the lower channel 10. The motor 136 is then operated in a direction to extend the screw jack 134. Since the link 128 and bell crank lever 124 cannot rotate about their pivot 126 due to the sector 86 being held in a fixed position with respect to the seat, the extension of the screw jack will cause the entire seat to move forwardly as the upper channel 18 slides forwardly of the lower channel 10. The latch lever 34 is then released to allow the latch dog 44 to engage one of the seats 50 to hold the seat in its horizontally adjusted position. Similarly, the seat may be moved horizontally rearwardly after latch lever 44 is released upon operation of the motor 136 to retract the screw jack 134.

Thus, this invention provides a vehicle seat which is selectively adjustable in either horizontal or vertical directions and which includes only a single power actuator to selectively adjust the seat in either direction. The majority of the parts of the seat are stamped sheet metal parts to reduce the cost of the seat to a minimum. In addition, since only a single power actuator is provided, the seat may be easily assembled upon the body by securing each of the spaced seat adjusting mechanisms to the vehicle floor pan and then securing the power actuator 134 at its rearward end to the bracket 140.

The other seat adjusting mechanism will be the same as the one shown and described except that no power actuator 134 will be provided. Other than this difference, each seat adjusting mechanism will be the same. It will be understood, of course, that each of the latch levers 34 and 108 will be suitably interconnected so that operation of one lever on one side of the seat will result in simultaneous operation of the same lever on the other side of the seat.

I claim:

1. A vehicle seat adjusting mechanism comprising, a support, a first member mounted on said support for horizontal adjustment relative thereto, a second member mounted on said first member for vertical adjustment relative thereto and for horizontal adjustment therewith relative to said support, a single power actuator of the extensible and retractable type operatively interconnected between said support and said second member and reacting thereagainst upon operation of said power actuator, first means operable to selectively interconnect said support and said first member to adjustably fix the horizontal position of said first member relative to said support whereby operation of said power actuator will cause said second member to be vertically adjusted relative to said first member and said support, and second means operable selectively and independently of said first means to fix the vertical position of said second member relative to said first member and said support whereby operation of said power actuator will cause said first member and said second member to be adjusted horizontally with respect to said support.

2. A vehicle seat adjusting mechanism comprising, a support, a first member slidably mounted on said support for horizontal adjustment relative thereto, a second member swingably secured to said first member for movement therewith relative to said support and being swingable relative thereto in any position thereof, a single power actuator of the extensible and retractable type operatively interconnected between said support and said swingable member and reacting thereagainst upon operation of said power actuator, first means operable to selectively interconnect said support and said first member to adjustably fix the horizontal position of said first member relative to said support whereby operation of said power actuator will cause said swingable member to swing relative to said first member and said support, and second means operable selectively and independently of said first means to fix the rotative position of said second member relative to said first member whereby operation of said power actuator will cause said first member to slide relative to said support.

3. A vehicle seat adjusting mechanism comprising, a support, a first member slidably mounted on said support for horizontal adjustment relative thereto, a second member swingably mounted on said first member for movement therewith relative to said support and being movable independently thereof in any position of said first member, means operably connecting said second member to a vehicle seat structure whereby swinging movement of said second member will adjustably fix the vertical position of said seat relative to said slidable member, a single power actuator of the extensible and retractable type operatively interconnected between said support and said second member and reacting thereagainst upon operation of said power actuator, first latch means operable to selectively interconnect said support and said first member to adjustably fix the position of said slidable member relative to said support whereby operation of said power actuator will cause said second member to swing relative thereto to vertically adjust said seat structure, and second latch means mounted on said seat structure and operable selectively and independently of said first means to fix the rotative position of said second member relative to said seat structure whereby operation of said power actuator will cause said slidable member to move relative to said support to adjust the horizontal position of said member and said seat structure.

4. A vehicle seat adjusting mechanism comprising, a support, a slidable member mounted on said support for horizontal adjustment relative thereto, a pair of spaced levers swingably mounted on said slidable member for horizontal movement therewith and being swingable relative thereto in any position thereof, a vehicle seat structure, means operatively connecting said first and second levers to said seat structure for vertical adjustment thereof upon swinging movement of said levers relative to said slidable member, means interconnecting said first and second levers for simultaneous swinging movement thereof, a single power actuator of the extensible and retractable type operatively interconnected between said support and one of said levers and reacting thereagainst upon operation of said power actuator to swing said one lever and said second lever relative to said slidable member, first latch means mounted on said slidable member and selectively engageable with said support to adjustably fix the position of said slidable member relative to said support whereby operation of said power actuator will cause said levers to swing relative to said support to vertically adjust the seat, and second latch means mounted on said seat structure and operable to selectively and independently of said first latch means to selectively fix the rotative position of said levers relative to said slidable member whereby operation of said power actuator will cause said slidable member and said swingable levers to be horizontally adjusted relative to said support to adjust the horizontal position of said seat structure.

5. A vehicle seat adjusting mechanism comprising, a support, a seat slide structure including a pair of relatively movable members, one of said members being fixed to said support and the other of said members being movable relative thereto, a lever swingably secured to said other member for movement therewith relative to said one member and for swinging movement relative thereto regardless of the position thereof, a seat structure, lost motion means pivotally interconnecting said lever and said seat structure for adjustment of said seat structure relative to said slidable member upon swinging movement of said lever, a power actuator operatively connected to said lever, latch means operable to selectively fix the position of said slidable member relative to said one member whereby operation of said power actuator will cause said lever to swing relative to said slidable member to thereby vertically adjust said seat, and means operable selectively and independently of said latch means to fix the rotative position of said lever relative to said slidable member whereby operation of said power actuator will cause said slidable member and said lever to move relative to said support to thereby adjust the said seat structure.

6. A vehicle seat adjusting mechanism comprising, a support, a seat slide structure including a pair of linearly movable members, one of said members being fixed to said support and the other of said members being linearly movable relative thereto, a pair of spaced levers swingably mounted on said slidable member for linear movement therewith relative to said support and being swingable relative thereto in any linearly adjusted position of said slidable member, a seat structure, first and second pivot means pivotally interconnecting said first and second levers and said seat slide structure, at least one of said pivot means including lost motion means, means interconnecting said first and second levers for simultaneous swinging movement thereof relative to said slidable member to thereby adjust the vertical position of said seat relative to said support, a power actuator operatively connected to one of said levers, latch means operable to selectively fix the linear position of said slidable member relative to said one member whereby operation of said power actuator will cause said levers to simultaneously swing relative to said slidable member to thereby vertically adjust said seat relative to said support, and means operable selectively and independently of said latch means to fix the rotative position of said lever relative to said slidable member whereby operation of said power actuator will cause said slidable member to move linearly relative to said one member and said support to thereby adjust the linear position of said seat.

7. A vehicle seat adjusting mechanism comprising, a support, a seat slide structure including a pair of horizontally movable members, one of said members being fixed to said support whereby the other of said members is movable horizontally relative thereto, a sector swingably secured to the other of said members for movement relative thereto in any horizontal position thereof and for horizontal movement therewith relative to said support, a bell crank swingably secured to said other member in spaced relationship to said sector, shiftable link means pivotally interconnecting said sector and said bell crank for simultaneous swinging movement thereof, a power actuator operatively secured to said sector, latch means operable to selectively fix the horizontal position of said other member relative to said one member whereby operation of said power actuator will cause said sector and said bell crank to swing relative to said other member, and means engageable with the teeth of said sector to fix the rotative position of said sector and said bell crank relative to said other member whereby operation of said power actuator will cause said other member and said sector and bell crank to move horizontally relative to said one member.

References Cited in the file of this patent
UNITED STATES PATENTS

| | | |
|---|---|---|
| 2,149,946 | Whedon et al. | Mar. 7, 1939 |
| 2,345,182 | Corber | Mar. 28, 1944 |
| 2,609,029 | Haberstump | Sept. 2, 1952 |
| 2,765,024 | Brundage | Oct. 2, 1956 |
| 2,784,764 | Rigby et al. | Mar. 21, 1957 |
| 2,791,263 | Chayne | May 7, 1957 |
| 2,792,873 | Herider et al. | May 21, 1957 |
| 2,809,688 | Brundage | Oct. 15, 1957 |
| 2,868,271 | Pickles | Jan. 13, 1959 |
| 2,961,621 | Williams | Jan. 19, 1960 |